United States Patent [19]

Nicolai

[11] 4,054,852
[45] Oct. 18, 1977

[54] SOLID STATE BLUE-GREEN LASER WITH HIGH EFFICIENCY LASER PUMP

[75] Inventor: Van O. Nicolai, Reston, Va.

[73] Assignee: The United States of America as represented by the Secretary of the Navy, Washington, D.C.

[21] Appl. No.: 709,477

[22] Filed: July 28, 1976

[51] Int. Cl.² .............................................. H01S 3/00
[52] U.S. Cl. ........................ 331/94.5 G; 331/94.5 Q; 331/94.5 P
[58] Field of Search ................ 331/94.5 F, 94.5 Q, 331/94.5 P

[56] References Cited
U.S. PATENT DOCUMENTS

| 3,233,189 | 1/1966 | Guggenheim | 331/94.5 |
| 3,830,557 | 8/1974 | Hook et al. | 350/150 |
| 3,863,177 | 1/1975 | Damen | 331/94.5 F |
| 3,927,033 | 12/1975 | Hammond | 260/343.2 R |
| 3,972,007 | 7/1976 | Naiman | 331/94.5 |

Primary Examiner—Martin H. Edlow
Attorney, Agent, or Firm—R. Sciascia; R. Beers; S. Sheinbein

[57] ABSTRACT

A high efficiency, high power blue-green laser capable of providing short pulses useful for underwater communication and detection systems. To provide the desired blue-green lasing, a solid state laser is pumped by a matched high-efficiency laser having a relatively long duration output pulses. Q-switching of the solid state laser is used to shorten the duration and increase the peak power of the pulses. Material found especially useful for practice of the invention are Holmium$^{+3}$ and Praseodymium$^{+3}$ as the solid state laser and a dye laser pumped by a mercury capillary lamp as the pumping laser.

7 Claims, 1 Drawing Figure

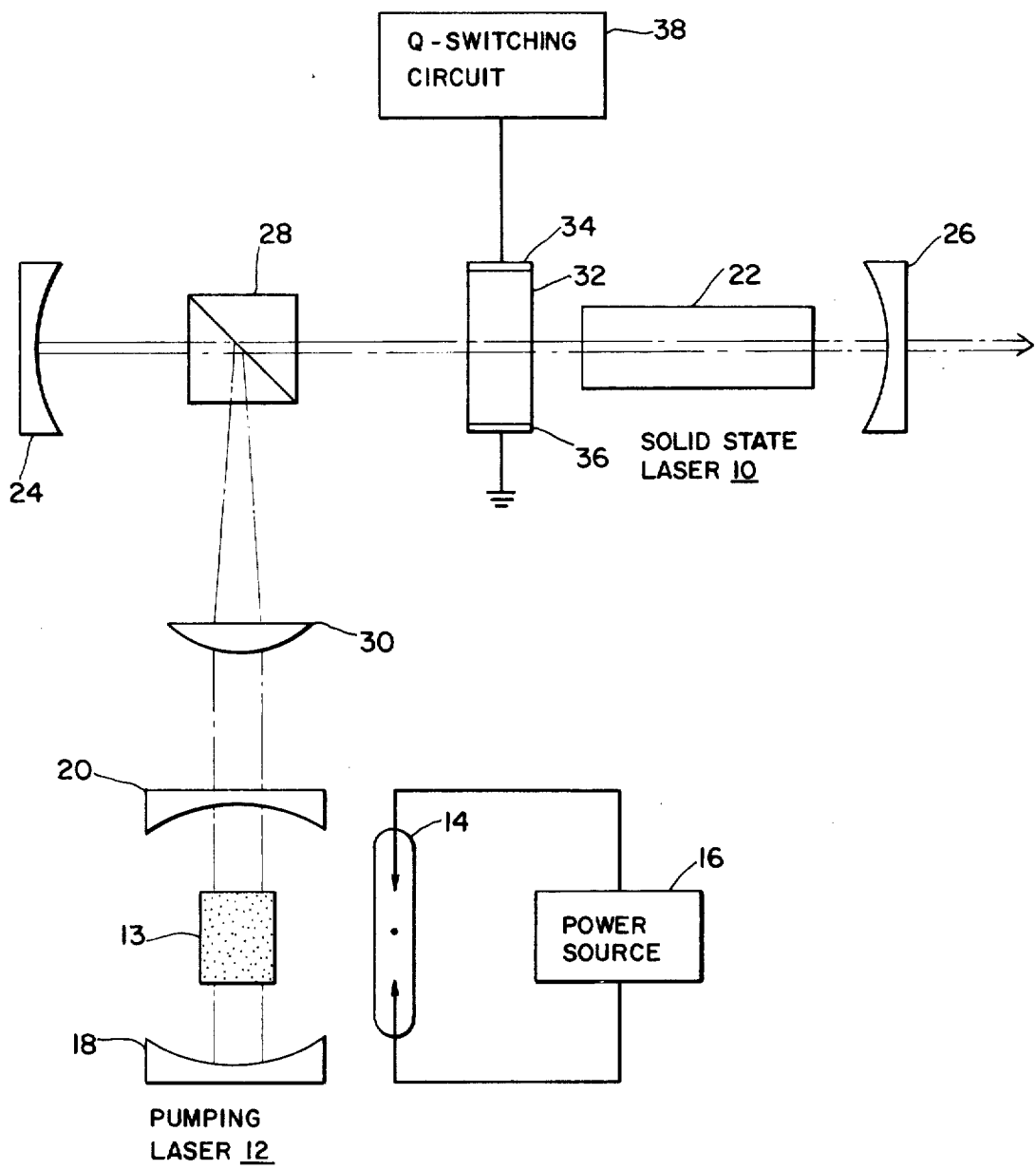

SOLID STATE BLUE-GREEN LASER WITH HIGH EFFICIENCY LASER PUMP

BACKGROUND OF THE INVENTION

This invention relates generally to lasers, and more particularly to high efficiency, high power blue-green lasers useful for underwater communication and detection systems.

Blue-green lasers are very desirable for underwater uses due to their low transmission losses in water. Existing blue-green lasers for such underwater uses are the frequency doubled Nd doped YAG laser, Cu vapor lasers and various dye lasers. A problem common to these existing lasers is low efficiency (generally less than 1%) thus necessitating very high iuput power levels to obtain output pulses sufficiently powerful for communication and detection systems. Typically a pulse of about 20 nsec duration containing 1 Joule of energy per pulse at a rate of 100 to 1000 pps is desired. The high input power requirements necessary to attain such output pulses brings about the need for large power sources which can be very impractical in carrier vehicles such as aircraft or submarines where space and weight considerations are critical.

Recently it has been found that a relatively efficient blue-green laser can be made by pumping a dye laser such a 4-MU (coumarin) with a mercury capillarly lamp. In articles by Dal Pozzo et al entitled "Pulsed Mercury Capillary Lamps for Dye Lasers Pumping: Spectral Measurements" and "Pulsed High-Pressure Mercury Capillary Lamps: A New Way of Pumping Dye Lasers", published in Applied Physics, Vol. 6 (1975) pp. 341-344 and 381-382 respectively, and incorporated herein by reference, spectral matches between the mercury capillary lamp and the 4-MU pump band were found to be as high as 24% giving an output in the blue with a pulse duration of 40 μsec. This would lead to an expected overall laser efficiency of over 5%. However, the long pulse duration and low peak power output of this laser is not sufficient for most desired communication and detection uses.

SUMMARY OF THE INVENTION

Accordingly, there is provided a blue-green laser capable of high efficiency and high power in providing short duration pulses. A pumping laser yielding a blue pulse output with relatively low power and long duration pulses pumps a blue-green solid state laser. Q-switching of the solid state laser is used to convert the output to high peak power pulses of shorter duration than those of the pumping laser. A dye laser pumped by a mercury capillary lamp can be used as the pumping laser. Preferred materials for the solid state laser are Holmium$^{+3}$ or Praseodymium$^{+3}$ doped crystal lattices.

OBJECTS OF THE INVENTION

It is therefore an object of the present invention to provide an improved blue-green laser.

Another object of the present invention is to provide a blue-green laser capable of producing high power, short duration pulses at high efficiency.

A further object of the present invention is to provide a blue-green laser capable of producing the short duration, high peak power pulses necessary for underwater communication and detecting systems.

BRIEF DESCRIPTION OF THE DRAWINGS

These and other objects, features and attendant advantages to the present invention will become better understood by reference to the following detailed description when considered in connection with the accompanying drawing wherein:

The FIGURE shows a partical block and partial schematic diagram of the laser system according to the present invention.

DETAILED DESCRIPTION OF THE PREFERRED EMBODIMENT

Referring now to the FIGURE, there is shown a solid state laser 10 pumped by a pumping laser 12. Pumping laser 12 comprises lasing material 13, pumping lamp 14 located alongside lasing material 13 and connected to power source 16, and mirrors 18 and 20 placed at respective ends of lasing material 13. As is conventional in lasers, pumping lamp 14 raises the energy level of atoms in lasing material 13 to a metastable level above their normal ground level. As the atoms return to their ground level, they give off a burst of light energy of a particular frequency determined by the difference between the metastable level and the ground level. Mirrors 18 and 20 reflect this light back into lasing material 13 thus stimulating more atoms to emit light and allowing oscillation. Mirror 20 is only partically reflective and therefore permits some of the light from lasing material 13 to pass through it to serve as the pumping laser output.

Since it is desired that the system operate in the blue-green area, it is necessary that pumping laser 12 also operates at or near this area. preferably around 4500A to 4600A. As a preferred embodiment, a dye laser such a 4-MU pumped by a mercury capillary lamp provides blue output pulses with high-efficiency but relatively low peak power and long duration (e.g. 40 μsec). Other lasers capable of operating in the blue-green area, such as other Coumarin dye lasers, could also be used as the pumping laser. If a dye laser is used it would be mounted in a conventional elliptical cavity (not shown).

The output of pumping laser 12 is focussed by focussing lens 30 onto polarizer 28 which is used to provide longitudinal pumping of solid state laser 10. The solid state laser 10 comprises laser rod 22, mirrors 24 and 26 located at the respective ends of laser rod 22, polarizer 28, and Q-switching device 32 placed between laser rod 22 and mirror 24. Mirror 26 is only partially reflective to allow some radiation from laser rod 22 to pass through it to provide the laser output. Q-switching device 32 is coupled to Q-switching circuit 38 by electrode 34 and to ground by electrode 36.

With Q-switching device 32 placed in its first mode by Q-switching circuit 38, laser radiation from pumping laser 12 is permitted to pump laser rod 22 to raise atoms therein to a metastable state. However, the polarization of the light emitted from rod 22 is changed by Q-switching device 32 to prevent its passage through polarizer 28 to mirror 24. This prevents any oscillation of solid state laser 10 and instead provides a large built-up of atoms in the metastable state in laser rod 22. When Q-switching circuit 38 switches Q-switching device 32 into its second mode, radiation from laser rod 22 is permitted to pass through polarizer 28 to mirror 24 thus stimulating a sudden very high power burst of energy as the large store of atoms change from their metastable to the ground levels. This sudden burst provides the short duration (e.g. 20 nsec.) high power pulses desired.

Solid state materials which have proven useful in producing blue-green lasing are Praseodymium$^{+3}$ and Holmium$^{+3}$ doped in crystal lattices such as YLIF$_4$, LaF$_3$ and CaF$_2$. Praseodymium$^{+3}$ can lase at 4793A in YLF while being pumped at 4500A. Holmium$^{+3}$ can be lased at 4910A in YLF while being pumped at 4500A.

There has therefore been provided a blue-green laser for producing short duration pulses with high energy at high efficiency. The polarizer used can be a conventional Glan Thompson Prism while the Q-switching device can be a Pockels cell. Obviously, numerous modifications and variations of the present invention are possible in light of the above teachings. It is therefore to be understood that within the scope of the appended claims the invention may be practiced otherwise than as specifically described herein.

What is claimed and desired to be secured by Letters Patent of the United States is:

1. A high efficiency, high peak power blue-green laser comprising:
    a pumping laser providing blue output pulses;
    a solid state laser pumped by said pumping laser, said solid state laser producing blue-green output pulses; and
    Q-switching means coupled to said solid state laser, said Q-switching means operating to limit the output pulses of said solid state laser to a shorter duration than the duration of said pumping laser pulses.

2. A high efficiency, high peak power blue-green laser as set forth in claim 1 wherein said pumping laser is a dye laser.

3. A high efficiency, high peak power blue-green laser as set forth in claim 2 wherein said dye laser is pumped by a mercury capillary lamp.

4. A high efficiency, high peak power blue-green laser as set forth in claim 3 wherein said dye laser comprises a solution of 4-MU.

5. A high efficiency, high peak power blue-green laser as set forth in claim 1 wherein said solid state laser comprises a crystal lattice doped with Praseodymium$^{+3}$.

6. A high efficiency, high peak power blue-green laser as set forth in claim 1 wherein said solid state laser comprises a crystal lattice doped with Holmium$^{+3}$.

7. A high efficiency, high peak power blue-green laser as set forth in claim 1 wherein said pumping laser pulses have a duration of approximately 40 $\mu$sec and said solid state laser pulses have a duration of approximately 20 nsec.

* * * * *